United States Patent Office 3,812,111
Patented May 21, 1974

1

3,812,111
IMIDAZOLINE TRANQUILIZING AGENTS
Herbert L. Wehrmeister, Terre Haute, Ind., assignor to Commercial Solvents Corporation, Terre Haute, Ind.
No Drawing. Filed Dec. 4, 1972, Ser. No. 312,077
Int. Cl. C07d 49/34
U.S. Cl. 260—240 D                    5 Claims

ABSTRACT OF THE DISCLOSURE

Imidazolines corresponding to the formula

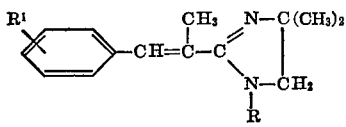

where R is isopropyl, phenyl, or hydroxyethyl and $R^1$ is hydrogen or chlorine. The compounds have utility as tranquilizing agents for warm-blooded animals.

BACKGROUND OF THE INVENTION

This invention relates to tranquilizing agents for warm-blooded animals. In a particular aspect it relates to certain imidazolines useful as tranquilizing agents.

Imidazolines have long been known in the art. They can be prepared, for example, by the method of Morey, U.S. Pat. 2,576,306. Imidazolines have many uses, some of which relate to physiological activity. For example W. Fruhstorfer and H. Muller-Calgan disclosed in U.S. Pat. 3,147,275 that certain imidazoline derivatives of alkylated phenol were useful for treating the smooth muscular system to obtain a contraction effect, and also to treat the circulatory system to obtain blood vessel constricting and blood pressure increasing properties.

SUMMARY OF THE INVENTION

It is an object of this invention to provide a method for tranquilizing warm blooded animals.

It is another object of this invention to provide tranquilizing agents of the class of imidazolines.

Other objects of this invention will be apparent to those skilled in the art from the disclosure herein.

It is the discovery of this invention that compounds, or pharmaceutically acceptable salts thereof, represented by the formula

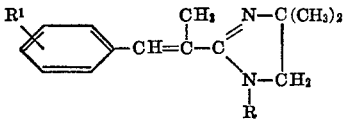

where R can be isopropyl, phenyl, or hydroxyethyl and $R^1$ is hydrogen or chlorine are tranquilizing agents for warm-blooded animals.

DETAILED DISCUSSION

The imidazolines of the present invention are readily prepared by condensing the appropriate aldehyde with an imidazoline corresponding to the formula

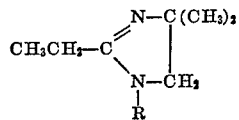

2 in accordance with known methods, e.g. the method of R. F. Purcell, U.S. Pat. 3,336,145 who discloses a method for preparing similar ethenyl oxazolines, or by the method of H. L. Wehrmeister, J. Org. Chem. 27, 4418 (1962).

Imidazolines corresponding to the above formula are known in the art. They can be prepared by reacting propionic acid with a diamine corresponding to the formula

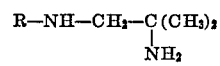

according to the method of Riebsomer, J. Am. Chem. Soc. 70, 1629–32 (1948) and J. Org. Chem. 15, 68–73, 237–240, 241–4, 909–17 (1950).

Imidazolines are weakly alkaline materials which form salts with most acids. Many of these salts are water-soluble and are advantageous for administering the compounds. The invention also contemplates, therefore, the administration of pharmaceutically acceptable salts of the compounds herein disclosed as well as the unneutralized compounds.

The compounds of the present invention have been found to exert a depressant action on the central nervous system when tested under standard and accepted pharmacological procedures, in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically, the compounds may be employed to induce a calming effect in animals.

In the pharmacological evaluation of the biological activity of the compounds of this invention, the in vivo effects were tested according to the method of Horn, Biometrics, 12:311 (1956). In this test, laboratory mice received the test compound (2 mice per dose level) at one-half log-dosage intervals by intravenous injection. The animals were observed by trained observers and pharmacological signs of tranquilization were noted. The median lethal dose $LD_{50}$ and the median effective dose ($MED_{50}$) for tranquilization were estimated. The safety factor was taken as the ratio of $LD_{50}/MED_{50}$.

The invention will be better understood with reference to the following examples. It is understood, however, that the examples are intended for illustration only and it is not intended that the invention be limited thereby.

EXAMPLE 1

4,4 - dimethyl - 1 - isopropyl-2-(2-p-chlorophenyl-1-methylethenyl)-2-imidazoline (P–1584), B.P. 143° (0.42 mm.)–139° (0.3 mm.), was prepared by reacting p-chlorobenzaldehyde with 4,4-dimethyl-1-isopropyl-2-ethyl-2-imidazoline. The latter compound is made by reacting propionic acid with N'-isopropyl-2-methyl-1,2-propanediamine.

The $LD_{50}$ by oral administration to mice was not determined but was less than 25 mg./kg. The $LD_0$ was less than 12.5 mg./kg.

The compound was tested for tranquilizing activity by the method of Horn. The $LD_{50}$ by intravenous administration was 1.8 (0.56–5.6) mg./kg. The median effective dose for tranquilization was 0.056 mg./kg. (0.018–0.18) and the safety factor was 32.0.

EXAMPLE 2

The experiment of Example 1 was repeated in all essential details except that benzaldehyde was substituted for p-chlorobenzaldehyde. The resulting compound 4,4-dimethyl-1-isopropyl-2-(1-methyl - 2 - phenylethenyl)-2-imidazoline (P–1583) had a boiling point of 131–135 at 2 mm. The nuclear magnetic resonance spectrum and infra-red absorption spectrum were consistent with the proposed structure.

The $LD_{50}$ by oral administration to mice was not determined, but the $LD_{100}$ was less than 12.5 mg./kg.

The compounds was tested for tranquilizing activity according to the method of Horn. The $LD_{50}$ by intravenous administration was 5.6 mg./kg. (1.8–18.0). The median effective dose for tranquilization was 1.0 mg./kg. (0.32–3.2) and the safety factor was 5.6.

EXAMPLE 3

The experiment of Example 2 is repeated in all essential details except that 4,4-dimethyl-1-phenyl-2-(1-methyl-2-phenylethenyl)-2-imidazoline is prepared by condensing 4,4 - dimethyl-1-phenyl-2-ethyl-2-imidazoline with benzaldehyde. The compound exhibits tranquilizing activity by intravenous administration to animals.

EXAMPLE 4

The experiment of Example 2 is repeated in all essential details except 4,4-dimethyl-1-hydroxyethyl-2-(1-methyl-2-phenylethenyl)-2-imidazoline is prepared by condensing 4,4-dimethyl-1-hydroxyethyl-2-ethyl-2-imidazoline with benzaldehyde. The compound exhibits tranquilizing activity by intravenous administration to animals.

What is claimed is:

1. Imidazoline compounds corresponding to the formula

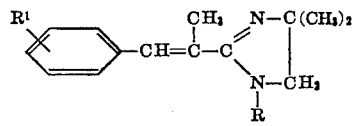

wherein R is isopropyl, phenyl, or hydroxyethyl and $R^1$ is hydrogen or chlorine.

2. The compound of claim 1 wherein R is isopropyl and $R^1$ is hydrogen.

3. The compound of claim 1 wherein R is isopropyl and $R^1$ is chlorine.

4. The composition of claim 1 wherein R is phenyl.

5. The composition of claim 1 wherein R is hydroxyethyl.

References Cited

UNITED STATES PATENTS

| 2,508,415 | 5/1950 | Morrill | 260—309.6 |
| 2,520,102 | 8/1950 | Tyron | 260—309.6 |
| 3,336,145 | 8/1967 | Purcell | 106—176 |

OTHER REFERENCES

Wehrmeister, J. Org. Chem., vol. 27, pp. 4418 to 4420 (1962).

JOHN D. RANDOLPH, Primary Examiner

U.S. Cl. X.R.

424—273; 260—307 F, 309.6